United States Patent

[11] 3,612,927

[72] Inventors: Pavel Mikhailovich Anisimov
Tkatskya ulitsa, 46, kv. 9, Moscow;
Ivan Grigorievich Barannik, ulitsa
Krasnostudencheskay, 8, kv. 16, Kherson;
Pavel Gdanievich Berman, ulitsa Ushakova,
58, kv. 44, Kherson; Boris Ivanovich
Evgrafov, ulitsa Chistye prudy, 9, kv. 8,
Moscow; Jury Alexandrovich Kupeev,
ulitsa 9 Rota, 15, kv. 11, Moscow; Alexandr
Vasilievich Kurbatov, ulitsa Pecherskay,
27, kv. 7, Kuibyshev; Boris Davydovich
Rafaevich, ulitsa Gagarina, 60, kv. 43,
Kuibyshev; Rem Vladimirovich Stepnykh,
ulitsa Gagarina, 84, kv. 8, Kuibyshev;
Vsevolod Ilich Shakhovtsev,
Scherbakovaskaya ulitsa 16/18, kv. 10,
Moscow; Viktor Konstantinovich
Judashkin, Samarskaya ulitsa, 148, kv. 23,
Kuibyshev; Mikhail Stepanovich Reschuk,
ulitsa Mira, 14, kv. 4, Kherson; Oleg
Andreevich Guschenko, ulitsa
Krasnokazarmennaya, 10, Kherson;
Evgeny Ivanovich Kharchenko, ulitsa
Oktyabrskoi revoljutsii, 6a, Kherson;
Alexei Mikhailovich Ljubimov,
Kamyshany, ulitsa Sovetskaya, 60,
Kherson; Pavel Grigorievich Kitsa,
Zalaegerseg, 23-a, kv. 25, Kherson, all of
U.S.S.R.
[21] Appl. No. 886,197
[22] Filed Dec. 18, 1969
[45] Patented Oct. 12, 1971
[32] Priority Dec. 19, 1968
[33] U.S.S.R.
[31] 1291942

[54] SEMICONDUCTOR RECTIFIER UNIT OF ELECTRIC GENERATOR
1 Claim, 6 Drawing Figs.

[52] U.S. Cl. ................................................ 310/68 D
[51] Int. Cl. ................................................ H02k 29/02
[50] Field of Search ........................................ 310/68, 68.4, 231

[56] References Cited
UNITED STATES PATENTS

| | | | |
|---|---|---|---|
| 3,160,771 | 12/1964 | Martin et al. ................ | 310/68 |
| 3,295,046 | 12/1966 | Margaira ..................... | 310/68 X |
| 3,184,625 | 5/1965 | Farison ....................... | 310/23 X |
| 2,722,652 | 11/1955 | Brainard ..................... | 310/68 X |
| 3,329,840 | 7/1967 | Binder ........................ | 310/68 |

Primary Examiner—Milton O. Hirshfield
Assistant Examiner—B. A. Reynolds
Attorney—Waters, Roditi, Schwartz & Nissen ABSTRACT: A semiconductor rectifier unit for an electric generator arranged in a three-phase full-wave rectification circuit, whose semiconductor rectifying elements are secured within metallic housings serving as heat transfer elements and located at the neutral point of PN circuits so that one of the PN junctions contacts the common housing with its P-region, while the other, with its N-region. The like leads of the PN junctions are connected to the current collecting bus bars arranged in two layers and interspaced by an insulating member, one of the bus bars directly adjoining the generator cover in electrical contact therewith. The common metallic housings containing the semiconductor PN circuits have openings through which mounting bolts are adapted to pass, which at the same time serve as generator phase leads applying AC voltage to the metallic common housings serving as the neutral point of the rectifier arms and to the external AC consumers.

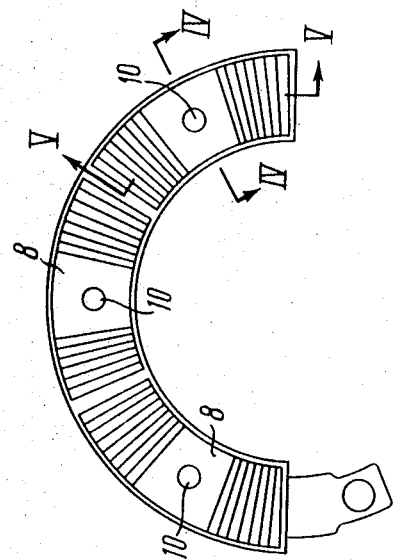
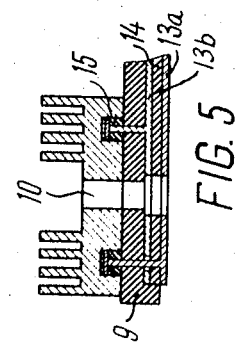
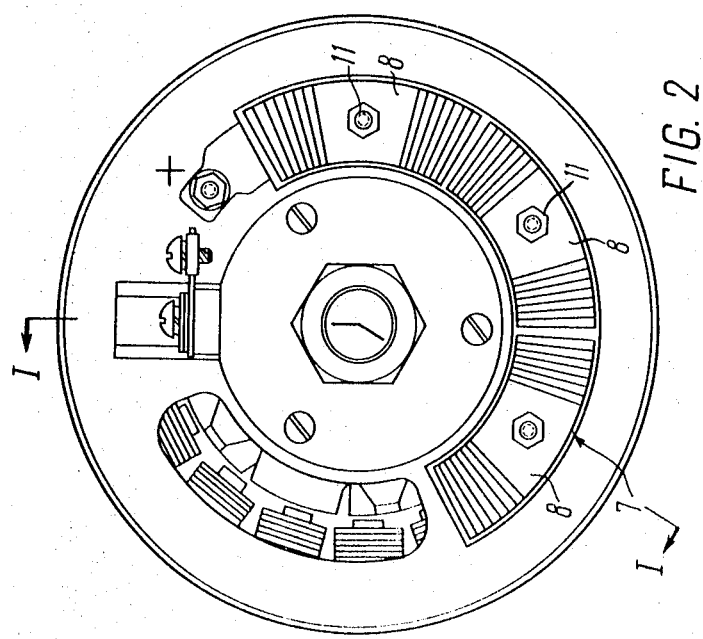
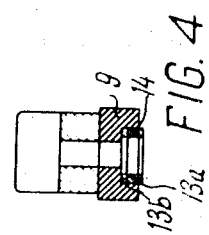

SEMICONDUCTOR RECTIFIER UNIT OF ELECTRIC GENERATOR

The present invention relates to electrical machines and, more particularly, has reference to electric generators employed basically in automotive vehicles.

Known in the art are electric generators comprising a rectifier unit arranged into a three-phase full-wave circuit so that one of the rectifying elements enclosed into a housing is electrically connected with this housing by its P-region while the other element is connected with the same housing by its N-region, the like terminals of the rectifying elements being interconnected through current-carrying bars.

A disadvantage of the known electric generator is that for equipping it with alternating-current terminals for supplying external consumers of electric energy, the construction of the generator is complicated in order to carry out the connection of the terminals of the rectifier unit both with the phases of the generator and with its output terminals, for which purpose it is necessary to provide additional mounting members, for example bolts, for securing the rectifier.

An object of the present invention is to eliminate the abovementioned disadvantages.

The main object of the invention is to simplify the process of mounting the rectifier unit on the generator, to reduce its dimensions and to simplify the construction of he generator by means of changing the construction of the housing of the rectifier phases.

This object is accomplished by providing an electric generator comprising a rectifier unit arranged into a three-phase full-wave circuit, in which the rectifying elements for each phase are enclosed into common housings so that one rectifying element is electrically connected with this housing through its P-region while the other element is connected therewith through its N-region, the other terminals of the said elements being interconnected through current-conducting bars; according to the invention, the housings for each phase of the rectifying elements are provided with openings for passing therethrough mounting bolts supplying an AC voltage of the generator to the rectifier unit and being at the same time the alternating-current phase terminals, whereas the current-conducting bars are arranged in two layers and are separated by an insulating spacer, in which case one of these bars directly adjoins the body of the generator.

The proposed electric generator makes it possible to simplify the process of mounting of the rectifier unit on the generator, to reduce the dimensions of the rectifier unit and to simplify its construction. The mounting of the rectifier unit in three points is more reliable than in the known rectifier and provides for a prolonged service life.

Furthermore, the proposed construction makes it possible to provide for terminals on the rectifier unit for supplying both alternating and direct current.

Further objects and advantages of the present invention will be apparent from the following description of a preferred embodiment thereof, reference being made to the accompanying drawings, in which:

FIG. 2 shows a view of the generator cover with a rectifier unit (a view along the arrow A in FIG. 1) according to the invention;

FIG. 3 shows a general view of the rectifier unit according to the invention;

FIG. 4 is a section of the rectifier unit at the place of the phase terminals according to the invention;

FIG. 5 is a transverse section of the rectifier unit at the place of disposition of the rectifier members according to the invention;

The electric generator consists of a three-phase synchronous AC and DC electrical machine with a built-in rectifier unit.

Figure 1:
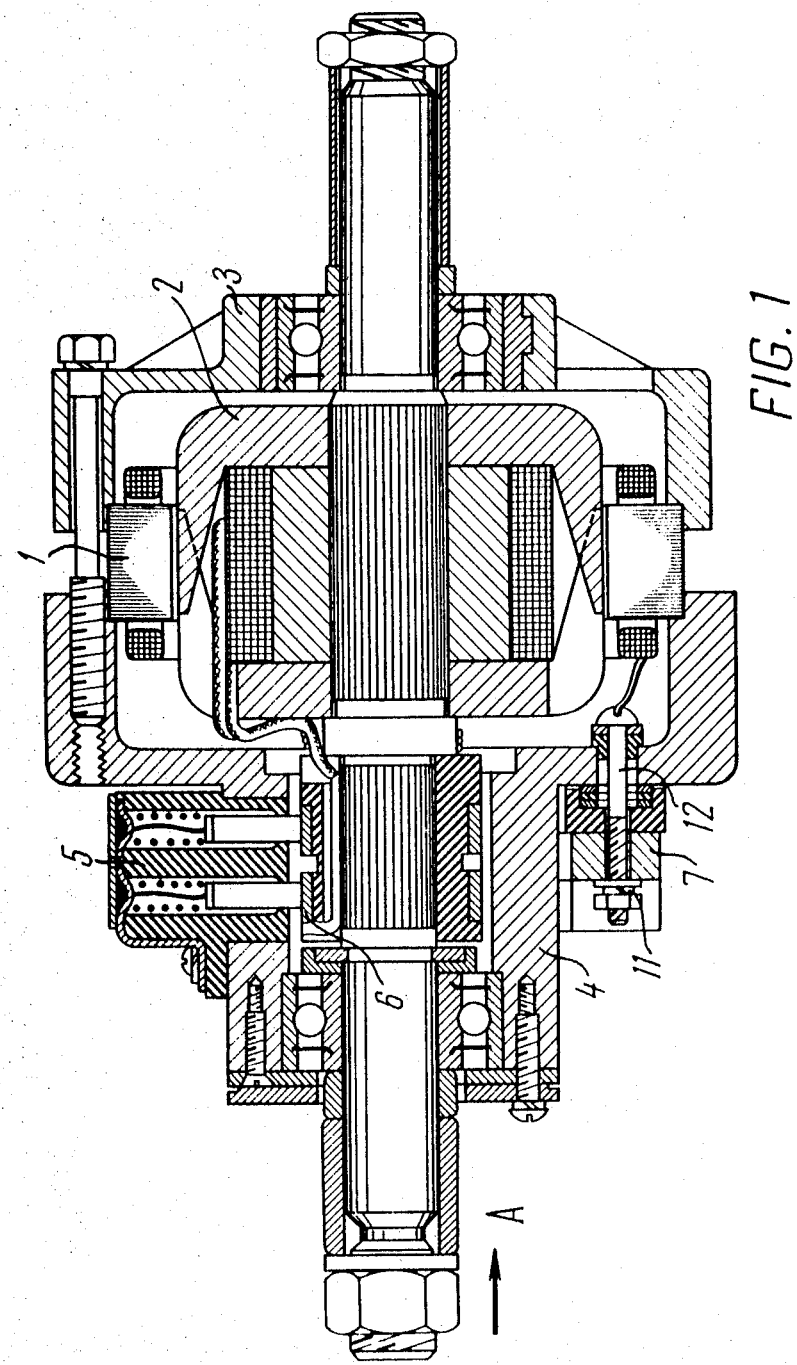
FIG. 1 shows a general sectional view of the generator with a rectifier unit according to the invention.
Figure 6:
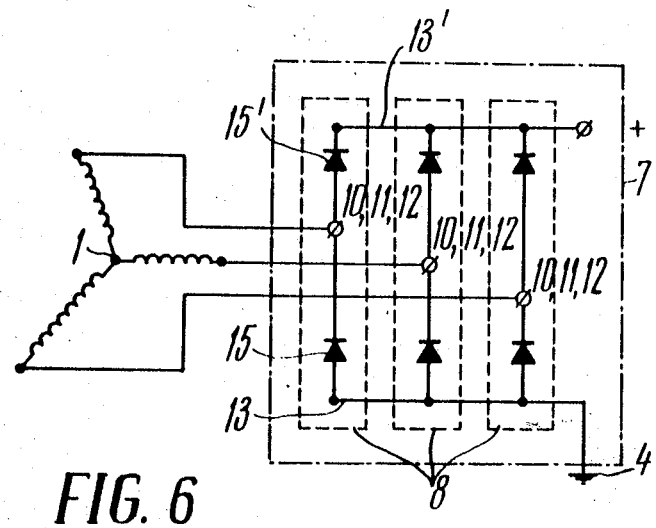
FIG. 6 is a schematic diagram of the generator and rectifier unit.

The generator comprises a stator 1 (FIGS. 1, 2 and 3) with a three-phase output winding and a rotor 2 rotating within the stator and having a field winding. The stator and rotor are secured to covers 3 and 4 while the field winding is fed through a brush holder unit 5. Mounted on the cover 4 of the generator at the side of the contact rings 6 is a rectifier unit 7. The rectifier unit 7 includes three identical housings 8 arranged on a common base 9 (FIGS. 4, 5) made of an insulating material and being a neutral point of the rectifier phase. Provided in the housings 8 (FIG. 3) are openings 10 serving for passing alternating-current terminals 11 (FIGS. 1, 2) and, at the same time, for securing the rectifier unit 7 on the cover 4 of the generator by means of mounting bolts 12. The direct-current bars 13a and 13b (FIGS. 4 and 5) of the rectifier unit 7 (FIG. 2) are arranged one above the other and are separated by means of an insulating spacer 14 (FIGS. 4, 5), one of the bars 13a adjoining the cover 4 of the generator, while the rectifier unit 7 itself being located beyond the cover 4 of the generator. Bar 13a forms the DC plus terminal and bar 13b forms the DC minus terminal. The housings 8 made of a current-conducting material are provided with special recesses for accommodating and sealing semiconductor rectifying elements 15 which are arranged into a three-phase full-wave rectifying circuit. AC voltage is supplied to the semiconductor elements 15, which are electrically connected to the metallic housing at 8 through bolt 12 connected to the phase leads of the generator.

The semiconductor elements may consist of conventional diodes, in which case through holes must be made in the housings 8 instead of the recesses.

The direct-current bars 13a and 13b may be located in one plane.

When the rotor 2 of the generator rotates and the field winding is fed with direct current through the brush holder unit 5, an alternating electromotive force is induced in the winding of the stator 1, in which case a DC, voltage is developed on the bars 13 and an AC voltage is developed on the terminals 11 of the mounting bolts 12, thus the generator provides for simultaneous power supply of electric energy consumers both with an alternating and direct current.

We claim:

1. An electric generator comprising in combination: a rectifier unit arranged into a three-phase full-wave circuit, rectifying elements for each phase of said rectifier unit enclosed into common housings so that one rectifying element is electrically connected with said housing by its P-region while the other element is connected with said housing by its N-region, bars connecting the like terminals of said rectifying elements, said bars are arranged in two layers and are separated by an insulating spacer, one of the bars directly adjoining the body of the electric generator, said housings for each phase of said rectifying elements are provided with openings through which are led mounting bolts supplying said rectifier unit with an AC voltage of the generator and serving as the alternating-current phase terminals.